United States Patent
Garey

(10) Patent No.: US 7,797,280 B2
(45) Date of Patent: Sep. 14, 2010

(54) REMOTE MAILBOX MANAGEMENT SYSTEM AND METHOD

(75) Inventor: Ronald Garey, Washington, DC (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 10/415,804

(22) PCT Filed: Nov. 6, 2001

(86) PCT No.: PCT/US01/42917
§ 371 (c)(1), (2), (4) Date: May 5, 2003

(87) PCT Pub. No.: WO02/37426
PCT Pub. Date: May 10, 2002

(65) Prior Publication Data
US 2004/0030722 A1 Feb. 12, 2004

(51) Int. Cl.
*G06F 17/00* (2006.01)
(52) U.S. Cl. ............ 707/643; 707/659; 700/226; 700/227; 700/240
(58) Field of Classification Search .......... 707/1–4, 707/643, 659; 379/100.08; 700/226–227, 700/240
See application file for complete search history.

(56) References Cited

U.S. PATENT DOCUMENTS

| | | | |
|---|---|---|---|
| 4,796,180 A | 1/1989 | Riley | |
| 5,043,908 A * | 8/1991 | Manduley et al. | 700/227 |
| 5,072,401 A | 12/1991 | Sansone et al. | |
| 5,119,293 A | 6/1992 | Hammond | |
| 5,168,444 A * | 12/1992 | Cukor et al. | 705/330 |
| 5,377,271 A | 12/1994 | Foreman et al. | |
| 5,537,543 A | 7/1996 | Itoh et al. | |
| 5,667,078 A | 9/1997 | Walach | |
| 5,686,713 A | 11/1997 | Rivera | |
| 5,786,748 A | 7/1998 | Nikolic et al. | |
| 5,787,405 A | 7/1998 | Gregory | |
| 5,975,747 A * | 11/1999 | Flaherty | 700/240 |
| 6,012,048 A | 1/2000 | Gustin et al. | |
| 6,088,684 A | 7/2000 | Custy et al. | |
| 6,119,106 A | 9/2000 | Mersky et al. | |

(Continued)

FOREIGN PATENT DOCUMENTS

EP 0 494 814 A1 7/1992

OTHER PUBLICATIONS

Office Action mailed Jun. 24, 2009 for Copending U.S. Appl. No. 11/798,516, filed May 15, 2007 (13 pages).

(Continued)

*Primary Examiner*—Don Wong
*Assistant Examiner*—Hanh B Thai
(74) *Attorney, Agent, or Firm*—Finnegan, Henderson, Farabow, Garrett & Dunner, LLP

(57) ABSTRACT

Methods and systems consistent with this invention manage a database of delivery destination information. Such methods and systems identify an item to be delivered to a destination; determine a batch of items for delivery having the item to be delivered to the destination; determine when the batch of items has been delivered: and update the database to indicate a delivery of the item destined to the destination after determining when the batch of items has been delivered.

33 Claims, 5 Drawing Sheets

U.S. PATENT DOCUMENTS

| | | | |
|---|---|---|---|
| 6,173,214 B1* | 1/2001 | Neelay et al. | 700/240 |
| 6,316,741 B1* | 11/2001 | Fitzgibbons et al. | 209/584 |
| 6,575,362 B1 | 6/2003 | Bator et al. | |
| 6,674,038 B1* | 1/2004 | Latta | 209/584 |
| 6,749,122 B1* | 6/2004 | Koenck et al. | 235/472.02 |
| 6,762,384 B1* | 7/2004 | Kechel | 209/584 |
| 2002/0010627 A1 | 1/2002 | Lerat | |
| 2002/0016726 A1* | 2/2002 | Ross | 705/7 |
| 2002/0032572 A1 | 3/2002 | Ikemori et al. | |
| 2002/0073040 A1 | 6/2002 | Schwartz et al. | |
| 2002/0097715 A1 | 7/2002 | Roerick | |
| 2002/0156645 A1* | 10/2002 | Hansen | 705/1 |
| 2002/0161702 A1 | 10/2002 | Milberger et al. | |
| 2002/0165279 A1 | 11/2002 | Kuebert et al. | |
| 2003/0182265 A1* | 9/2003 | Robbins | 707/1 |
| 2003/0200113 A1* | 10/2003 | Latta | 705/1 |
| 2005/0288986 A1* | 12/2005 | Barts et al. | 705/9 |
| 2006/0020366 A1* | 1/2006 | Bloom | 700/226 |

OTHER PUBLICATIONS

International Search Report and Written Opinion issued in Corresponding International Application No. PCT/US01/42917 (3 pages).
Office Action dated Dec. 22, 2009 issued in co-pending U.S. Appl. No. 11/798,516, filed May 15, 2007 (13 pages).

* cited by examiner

**6/30/00 - 1:30 PM
PO BOX STATUS**

MAIL IN YOUR PO BOX: —510

| TYPE —515 | PIECES —520 | MORE INFO —525 |
|---|---|---|
| Express Mail | 0 | ☐ |
| 1st Class / Priority Mail | 0 | ☐ |
| eMoney Orders | 1 | ☐ |
| Post Cards | 4 | ☐ |
| Other Mail Items | 20 | ☐ |

CALL WINDOW PICKUP: —530

| | | |
|---|---|---|
| Parcels | 6 | ☐ |
| Signature Required Mail | 3 | ☐ |
| USPS Call Window Operator | 1-800-555-1212 | |

MAIL EN ROUTE: —535   1   ☐

CUSTOMER REQUEST:
  LAST TIME MAIL PLACED IN BOX: 6/29/99 - 3:00PM —540
  LAST AUTO CALL TO CUSTOMER: 6/29/99 - 3:30 PM —545

RETURN TO BOXCHECK MAIN MENU

FIG. 5

REMOTE MAILBOX MANAGEMENT SYSTEM AND METHOD

DESCRIPTION OF THE INVENTION

1. Field of the Invention

The present invention relates to remotely managing a delivery destination. More particularly, the invention may relate to methods and systems for remotely managing a post office box.

2. Background of the Invention

The United States Postal Service (USPS) has approximately 16 million rented Post Office (PO) boxes. Typically, when mail arrives at the post office for delivery to a rented PO box, a postal worker "cases" the mail (i.e. places the mail in the appropriate PO boxes) without any further action. A conventional PO box renter (or customer) is unaware of the contents of the box until he or she personally drives to the post office, opens the box, and looks inside. The conventional PO box rental customer must manage the PO box physically and in person.

There are several problems with conventional method of managing PO boxes. First, a customer wastes time and transportation costs each time he or she makes a trip to the post office and the PO box is empty. Similarly, the customer wastes time if the PO box contains only bulk or "junk" mail that the customer disposes of without reading or would have waited to read at a later time. Unnecessary trips to the post office also contribute to unpleasant post office congestion. Paradoxically, problems also occur when a customer elects not to visit the post office to check the PO box if the PO box contains important time-sensitive mail, such as an overdue bill or a perishable item.

The USPS addressed some of the problems of PO box management when it implemented its Phase 1 PO Box Information System. The Phase 1 system provided a Customer Mail Status Database to store PO box mail data. The database was updated whenever mail was cased at the post office. The Phase 1 system allowed customers to access the database and determine whether there was any mail in their PO box.

In the Phase 1 system, after mail was delivered to a post office and mail clerks cased the mail, the mail clerks then used a Computer Track & Tracing bar code reader ("CTT wand"), with various scanning options, to collect mail status data. To do this, the CTT wand software had to be designed with several scanning settings:

1=Collect Data
2=Transmit Data
3=Correction
4=Call at Window

When "accountable mail" (i.e. traceable mail, such as registered mail and insured mail) was cased, the clerk set the CTT wand to option 4 ("call at window") and "wanded" the delivery PO box. When "non-accountable" mail was cased, the clerk set the CTT wand to option 1 ("collect data") and "wanded" each PO box not containing mail. Data was relayed from the CTT want via site telecommunication modems to the Customer Mail Status Database. After data collection, the system could determine which PO boxes contained mail.

The Phase 1 system also provided an interactive voice response interface for customers. From a remote location, PO box customers could dial a local phone number to find out whether mail was available in their PO box or at the "call window" (for accountable mail). A customer could also leave a voice message about their mail.

Phase 1 was tested in Springfield, Mass. in 1995 and 1996. The system worked without problems, enabling customers to determine whether or not their PO Box contained mail and whether they had accountable mail at the call window. The Phase 1 system, however, had several drawbacks, including an unacceptable increase in work hours caused by wanding the PO boxes. In the Phase 1 system, even when most PO boxes received no mail, the mail clerk was required to wand each individual "no-mail" box with the CTT wand. Another drawback was the paucity of information available to PO Box customers—the Phase 1 system supplied only binary mail/no-mail information and binary call-at-window/don't-call-at-window information. Customers still made unwanted trips to the Post Office when their boxes contained only "junk" mail. Yet another drawback was the limited availability of expensive telephone lines. If several customers tried to check the status of their PO boxes at the same time, they may get busy signals.

Accordingly, a need exists to improve remote management of PO boxes. Systems and methods are needed to conveniently and efficiently provide customers with detailed information concerning items available in their PO box. A need also exists to inform PO box customer that an item is en route to their PO box. With this information, customers may efficiently manage their PO box and avoid the problems normally associated with renting a PO box.

SUMMARY OF THE INVENTION

Methods and systems consistent with this invention manage a database of delivery destination information. Such methods and systems identify an item to be delivered to a destination; determine a batch of items for delivery having the item to be delivered to the destination; determine when the batch of items has been delivered; and update the database to indicate a delivery of the item destined to the destination after determining when the batch of items has been delivered.

Both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 5 is an exemplary PO box management web-site information screen consistent with the present invention.

DESCRIPTION OF THE EMBODIMENTS

This application claims priority to U.S. Provisional Patent Application No. 60/245,670, filed Nov. 6, 2000, entitled "Remote Mailbox Management System and Method," which is herein incorporated by reference.

Reference is now made in detail to specific exemplary embodiments of the invention. Wherever possible, the same reference numbers are used throughout the description to refer to the same or like parts. The invention is described using embodiments involving mail as handled by the USPS. One of ordinary skill in the art will recognize, however, that the principles of the present invention apply to any type of shipping or delivery of objects or items from a sender to a receiver's delivery destination.

Systems and methods consistent with the present invention provide users who receive items at specified delivery destinations, such as PO box customers, with the ability to remotely access information about the items bound for, or already delivered to, the destination, and the ability to act upon the information. For example, a system consistent with the present invention allows a PO box customer to call a telephone number, and by responding to the prompts generated by an interactive voice response system, learn that his or her PO box currently contains: (1) a first-class letter from General Electric Utilities of Macon, Ga.; (2) two bulk-class catalogs, one from Shopper's Food Warehouse, and one from Land's End; (3) and a parcel measuring two by four by six inches and weighing five ounces from the United States Mint in Philadelphia, Pa. Such a system, for example, may also inform the PO box customer that one first-class letter, currently located in the Los Angeles Airport, is in route to the customer's PO box from G. Greene of Alameda, Calif.

Figure 1:
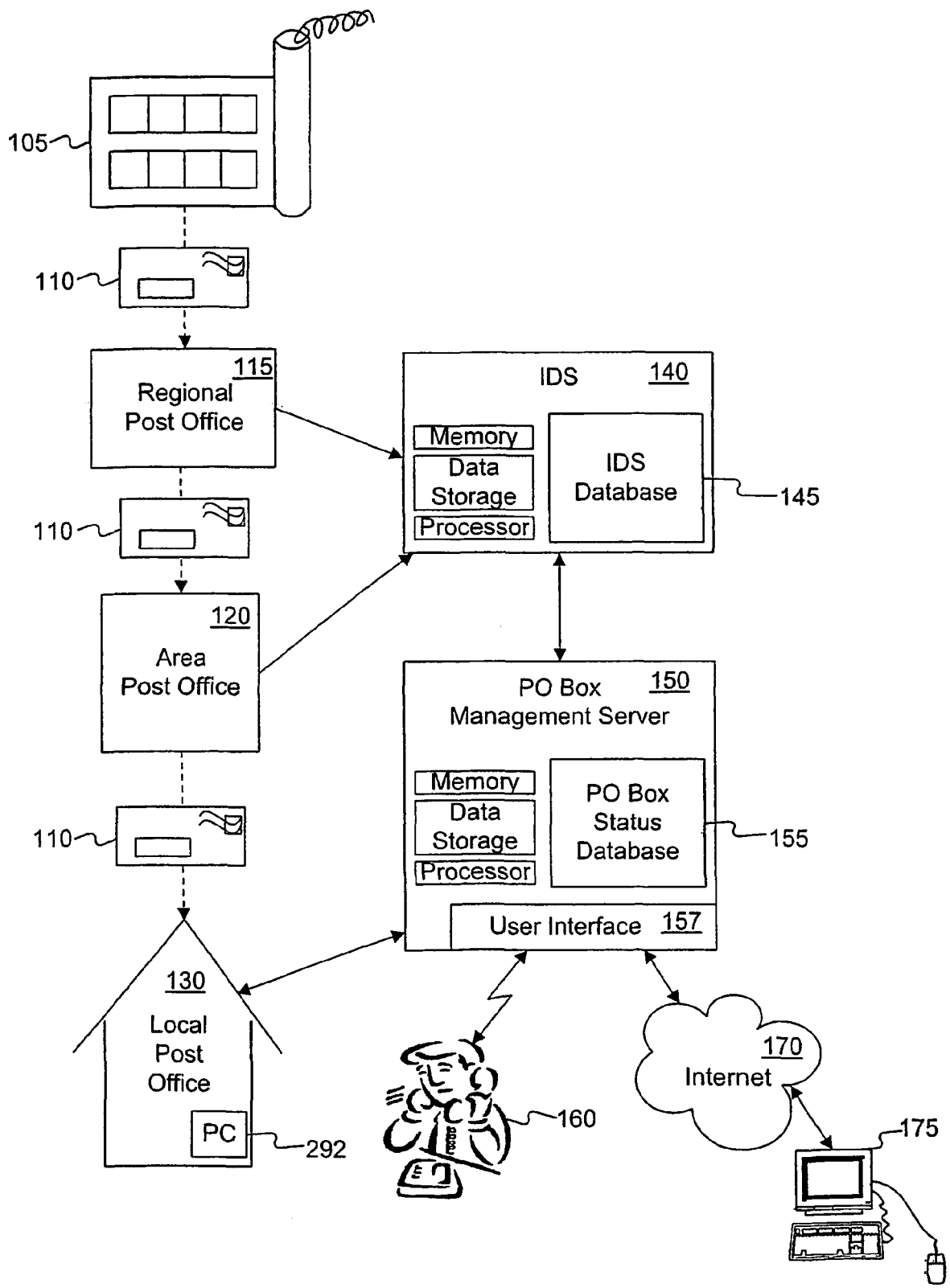
FIG. 1 is a block diagram illustrating the interconnection of information servers and a PO box management server in a system consistent with the present invention.

FIG. 1 illustrates one embodiment consistent with the present invention, including an Integrated Data System 140 (IDS), which tracks mail flow within the postal service, a PO box management server 150, which controls a PO box status database 155, and a user interface 157 to PO box management server 150. User interface 157 allows PO box customers to access information in PO box status database 155 using, for example, a telephone 160, or an Internet 170 with a personal computer 175.

Delivery tracking systems, such as the USPS's Integrated Data System 140, use a unique tag, such as a PLANETCODE bar code, to track an item, such as a mail piece 110, as it travels from a sender, such as a utility company 105, to a recipient's delivery destination, such as a PO box in a Local Post Office 130. Each time mail piece 110 passes through a piece of equipment which reads the tag, for example in Regional Post Office 115, or the tag is manually scanned by an operator, for example in an Area Post Office 120, the mail piece's location information is updated in an IDS database 145 maintained by IDS 140. Other examples of tags are POSTNET bar code and National ID tag bar code.

IDS database 145 may also contain information about mail piece 110 in addition to its location. For example, IDS database 145 may contain information identifying mail piece 110 such as the sender, the recipient, the type (e.g. first class mail, registered mail, priority mail, parcel, etc.), the size and weight, and the mailing date. Generally, IDS database 145 may contain all the information discernable from an outside inspection of mail piece 110. IDS database 145 may also contain information regarding the contents of mail piece 110 (e.g., that an envelope contains a bill), if such information is .provided by the sender, such as utility company 105.

PO box management server 150 periodically communicates with IDS 140. For example, PO box management server 150 may communicate with IDS 140 once a day, or more frequently such as once every few minutes or every time a mail batch is cased. PO box management server 150 may identify the PO boxes in Local Post Office 130 to IDS 140. IDS 140 may provide information from IDS database 145 for mail pieces, such as mail piece 110, bound for the identified PO boxes. IDS 140 may also provide the identity of the mail batches that contain the mail pieces.

Local Post Office 130 may then notify PO box management server 150 that the mail batch containing mail piece 110 has been cased (i.e., the mail pieces in the batch have been put into PO boxes, ready for customer pick-up), and PO box management server 150 may update PO box status database 155, indicating that mail piece 110 is currently located in its destination PO box. In addition, PO box management server 150 may also notify the appropriate PO box customer that mail piece 110 has been placed in the customer's PO box. Using user interface 157, PO box management server 150 may notify a customer via telephone 160, email over Internet 170 to personal computer 175, fax (not shown), pager (not shown), or any other conventional method of communication.

Similarly, a PO box customer may access PO box status database 155 through user interface 157 and learn all the information associated with mail piece 110, including current location, sender, type, physical dimensions, etc. With this information, a PO box customer may efficiently plan trips to Local Post Office 130 to pick up the contents of the PO box, or take other actions regarding mail piece 110, such as directing that it be forwarded to a different destination.

PO box management server 150 comprises a memory, a processor, and a data storage device necessary to run software to carry out the functions of PO box management server 150 described above. Likewise IDS 140 comprises a memory, a processor, and a data storage device necessary to run software to carry out the functions of IDS 140 described above.

Figure 2:
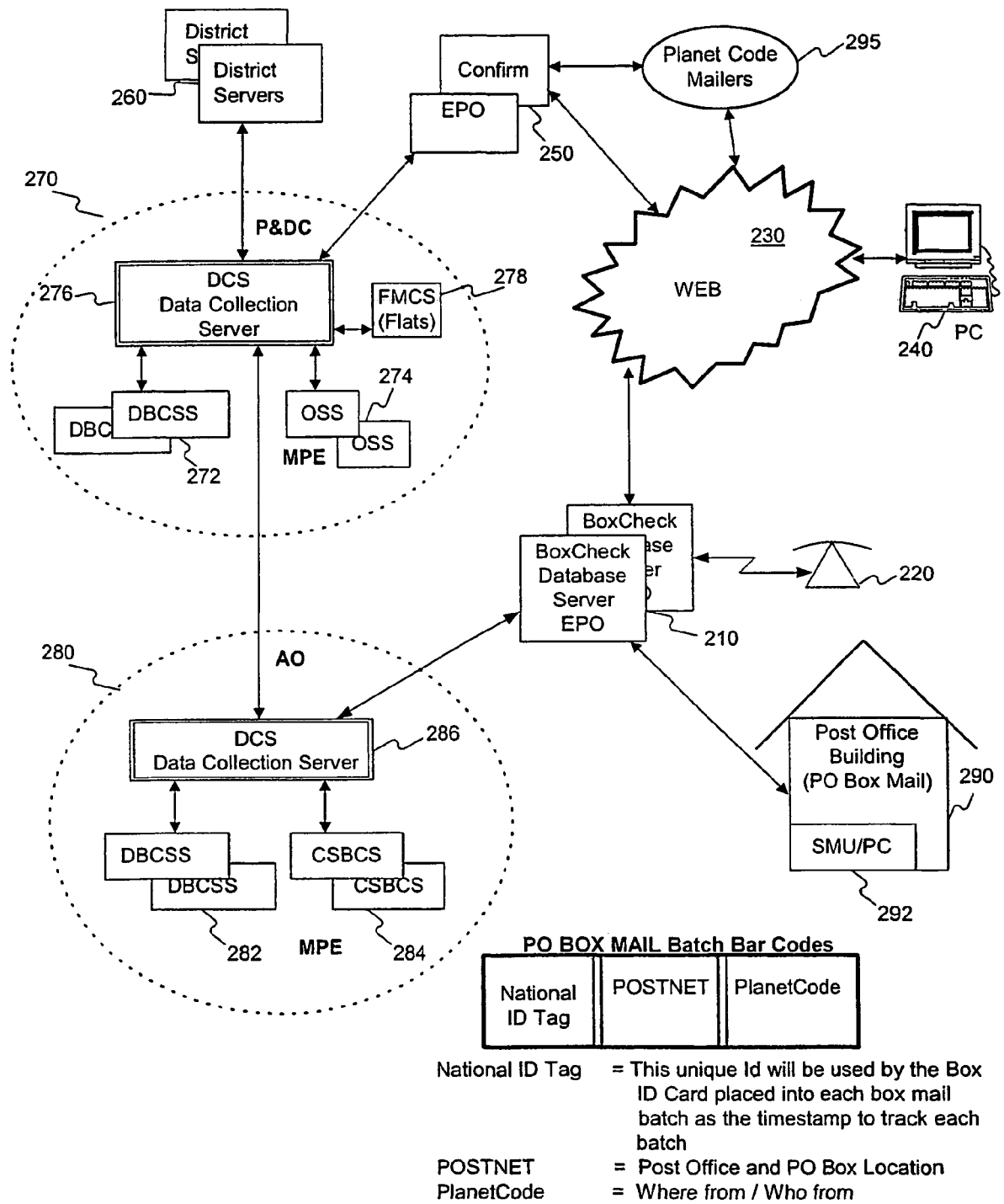
FIG. 2 is block diagram illustrating a specific interconnection of various USPS information servers in a system consistent with the present invention.

FIG. 2 is block diagram illustrating a specific interconnection of various USPS information servers in a system consistent with the present invention. FIG. 2 shows, in more detail, the item tracking information flow from mail handling centers to PO box customers via a telephone 220 or via a World Wide Web 230 to a personal computer 240. For example, the mail handling centers include a Processing and Distribution Center (P&DC) 270, an Area Office (AO) 280, and a Post Office Building 290. AO 280 comprises mail processing equipment (MPE) such as a Delivery Bar Code Sorting System (DBCSS) 282 and a Carrier Sorting Bar Code System (CSBCS) 284. As mail enters AO 280, information is scanned from mail pieces using DBCSS 282 and CSBCS 284 and entered into a Data Collection Server (DCS) 286. Information is scanned from the mail pieces from bar codes such as National ID Tag, POSTNET, or PLANETCODE.

Mail processing equipment in P&DC 270 comprises a DBCSS 272, an Optical Scanning System (OSS) 274, and Flat Mail Carrier System (278). As mail enters P&DC 270, information is scanned from mail pieces using DBCSS 272, OSS 274, and FMCS 278 and entered into a Data Collection Server (DCS) 276. DCS 276 and DCS 286 may perform some of the functions of IDS 140 in FIG. 1. Information from DCS 286 and DCS 276 may be uploaded into District Servers 260, Electronic Post Office (EPO) 250, or a Box Check Database Server 210. Box Check Database Server 210 may perform some of the functions of PO box management server 150 in FIG. 1.

The Post Office Building 290 comprises a Site Monitor Unit (SMU) 292 having a PC that may interface with Box-Check Database Server 210. The SMU may be attached to the CTT wand and may upload to the BoxCheck Database Server 210 information concerning batches of mail that have been cased. PO box customers may use, for example, PC 240, telephone 220, or SMU 292 to access information in the Box Check Database Server 210. Also, mailers, such as Planet Code Mailers 295, may access information concerning mail pieces through web 230 or EPO 250 to confirm deliveries, for example. SMU/PC 292 comprises a memory, a processor, and a data storage device necessary to run software to carry out the functions of PC 292 described above.

Figure 3:
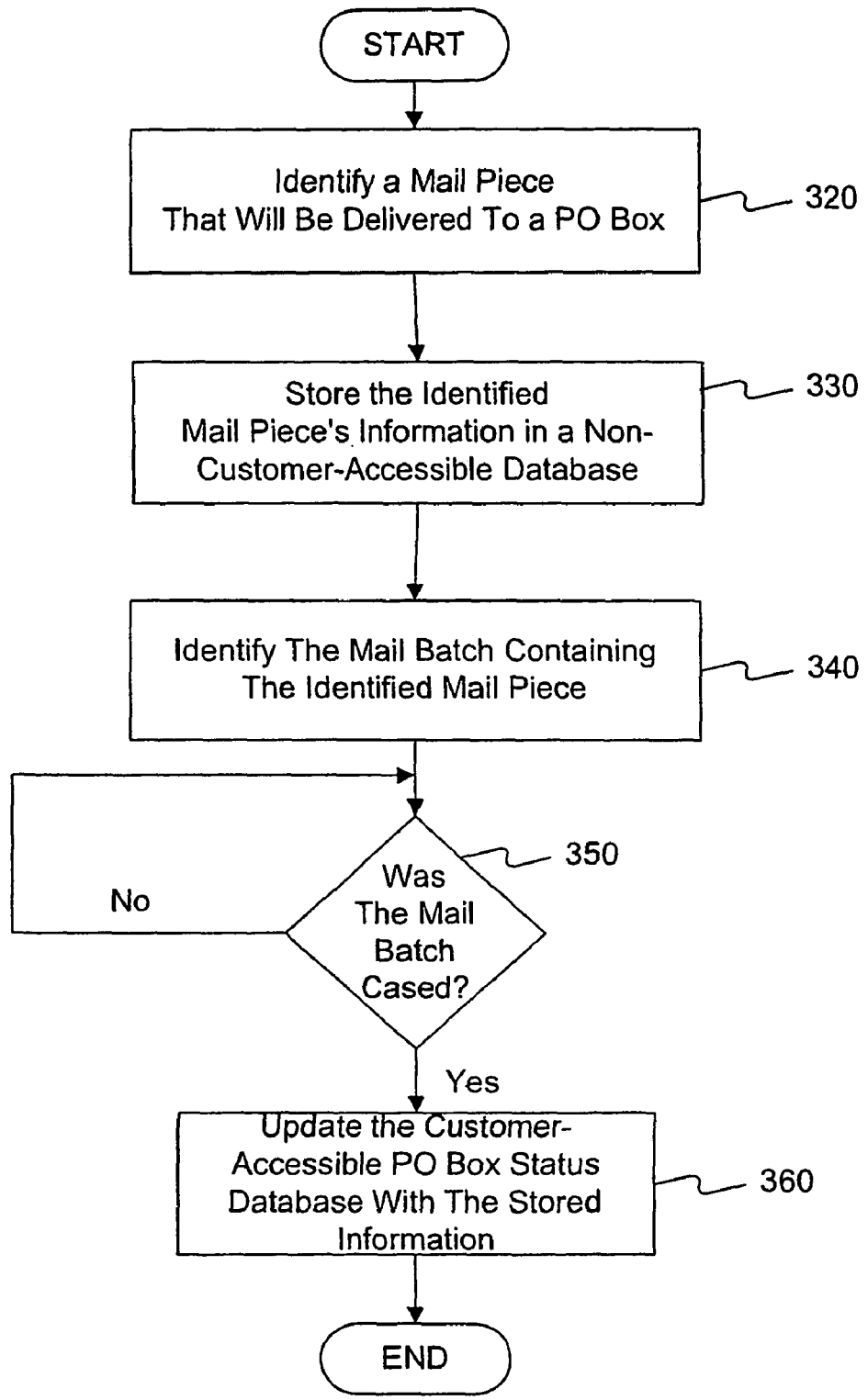
FIG. 3 is a flow chart of an exemplary process for updating a PO box status database consistent with the present invention.

FIG. 3 is a flow chart of an exemplary process for updating PO box status database 155 consistent with the present invention. In one embodiment consistent with this invention, PO box management server 150 may identify to IDS 140 a mail piece that will be delivered to a PO Box (step 320). IDS 140 may give PO box management server 150 information regarding the identified mail piece, and PO box management server 150 may store the information (step 330). In addition, IDS 140 may identify to PO box management server 150 the mail batch that contains the mail piece (step 340). In step 350, the process waits until a postal employee wands the batch ID tag containing the mail piece, indicating that the postal employee has cased all the mail pieces in the batch. Once the batch is cased, PO box management server 150 updates PO box status database 155 with the information, indicating that the mail piece's location is in the destination PO box (step 360).

In another embodiment consistent with this invention, step 320 may be replaced or supplemented with identifying a particular PO box. Thus, as described above, PO box management server 150 identifies to IDS 140 a particular PO box. IDS 140 responds to PO box management server 150 with the information regarding that identified PO box, such as whether a mail piece is destined for the particular PO box. In this embodiment, step 330 may be replaced or supplemented with storing the information supplied by IDS 140 in PO box management server 150. As described above, IDS 140 may also identify to PO box management server 150 the mail batch that contains any mail pieces destined to the identified PO box (step 340). In step 350, the process waits until a postal employee wands the batch ID tag containing any such mail pieces, indicating that the postal employee has cased all the mail pieces in the batch. Once the batch is cased, PO box management server 150 updates PO box status database 155 with the stored information, indicating that the mail piece's location is in the destination PO box (step 360).

In one embodiment of the present invention, the operator casing the mail need only wand a single batch ID tag to notify PO box management server 150 that mail piece 110 has been placed in a PO Box. As discussed above, IDS 140 may provide the information needed to associate mail piece 110 with the mail batch that contains it. When notified that a mail batch has been cased, PO box management server 150 may use the batch contents information to update PO box status database 155 to reflect that mail pieces within the batch are currently located in their destination PO boxes. Thus, mail piece 110 current location information in PO box status database 155 may be accurate to within a few minutes. Because notification may be done at a batch level requiring only a single wanding, the extra labor costs associated with the Phase 1 system may be avoided.

In one embodiment of the present invention, a copy of all the tracking and other information contained in IDS database 145 is made available to PO Box customers. From this information, a customer accessing PO box status database 155 may learn much more than the binary state of the PO box—whether it contains mail or not. In addition, a customer may learn what type of mail is in the PO box, who it is from, its size, etc. A customer may also learn the same information about items that are in route to the PO box.

Figure 4:
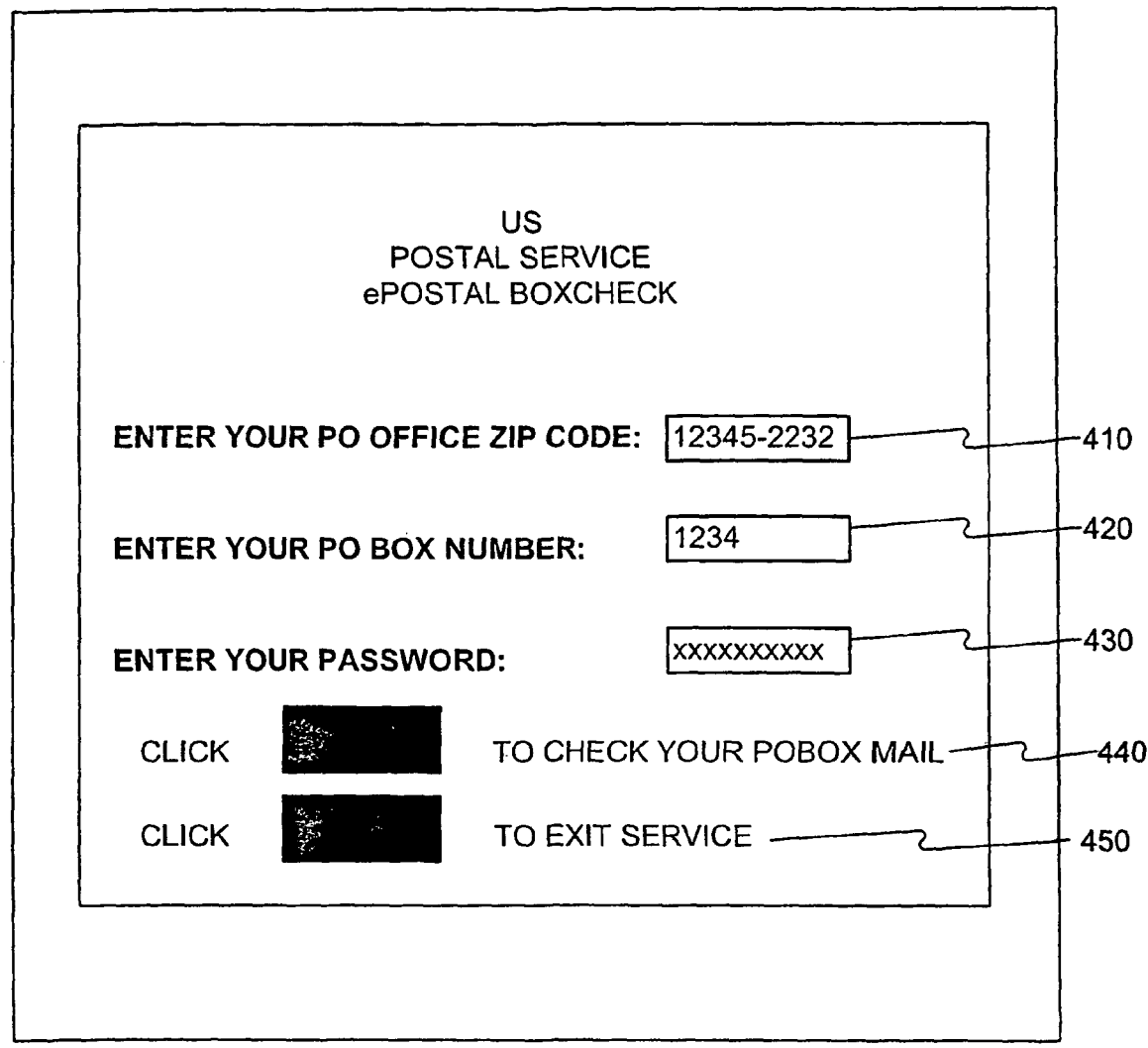
FIG. 4 is an exemplary PO box management web-site log-in screen consistent with the present invention.

One embodiment consistent with the present invention allows PO box customers to access information regarding items addressed to their PO box via Internet 170. FIG. 4, for example, illustrates a PO box management web-site secure log-in screen consistent with the present invention. As shown, a customer identifies his PO box by entering a local post office zip code 410 and a PO box number 420. To prevent unauthorized access, the customer may also enter a password 430. If the customer selects a "check your PO box" option 440, PO box management server 150 retrieves information for the specified PO Box from PO box status database 155 and displays it to the customer.

FIG. 5 illustrates an exemplary PO box management website information screen consistent with this invention. The screen shows what mail is currently in the customer's PO box 510 by type 515 and number of pieces 520. If the customer desires more information regarding each type, such as who the sender is, the physical size, the mailing date, the contents, etc., he may select an appropriate "More Info" button 525 and the additional information is displayed on another screen (not shown).

The exemplary screen of FIG. 5 also provides information regarding (1) mail items that must be picked up at the call window 530, (2) mail items in route 535, (3) the last time mail was placed in the PO box 540, and (4) the last time the customer was automatically notified via telephone regarding the status of the PO box 545.

Other embodiments of the invention will be apparent to those skilled in the art from consideration of the specification and practice of the invention disclosed herein. For example, one skilled in the art would realize that the principles of the present invention encompass other types of item delivery destinations, such as contracted mail destinations (e.g., Mailboxes Etc.), or a home mailbox, in addition to post office boxes. It is intended that the specification and examples be considered as exemplary only, with a true scope and spirit of the invention being indicated by the following claims.

What is claimed is:

1. A method, implemented using a computer system, of managing a database of delivery destination information, comprising:
    identifying an item to be delivered to a particular destination;
    determining a batch comprising a plurality of items, each of the items of the batch to be delivered to one of a plurality of destinations, the batch being determined before delivery, the batch comprising the item to be delivered to the particular destination, the plurality of destinations comprising the particular destination;
    determining when all of the plurality of items in the batch have been delivered to their respective destinations; and
    based on the determination that all of the plurality of items in the batch have been delivered to their respective destinations, providing a single signal that all of the plurality of items in the batch have been delivered to their respective destinations; and
    indicating, based on the single signal, that every item in the batch is located at its respective destination.

2. The method of claim 1, further comprising:
    identifying the particular destination for delivery; and
    querying the database for the item to be delivered to the particular destination.

3. The method of claim 1, wherein the particular destination for delivery is a post office box.

4. The method of claim 1, further comprising:
    identifying a customer associated with the particular destination; and
    notifying the customer that the item was delivered to the particular destination.

5. The method of claim 4, wherein notifying comprises notifying the customer by telephone.

6. The method of claim 4, wherein notifying comprises notifying the customer by email.

7. The method of claim 1, further comprising:
identifying a customer associated with the particular destination; and
configuring the database of delivery destination information to be accessed by the customer.

8. The method of claim 1, further comprising querying the database for a current location of the item.

9. The method of claim 8, further comprising updating the database of delivery destination information of the current location of the item.

10. The method of claim 1, further comprising querying the database for a type of the item.

11. The method of claim 1, further comprising querying the database for a type of content of the item.

12. A computer-readable storage medium containing instructions for controlling a computer system to perform a method of operating a processor, the method comprising:
identifying an item to be delivered to a particular destination;
determining a batch comprising a plurality of items, each of the items of the batch to be delivered to one of a plurality of destinations, the batch being determined before delivery, the batch comprising the item to be delivered to the particular destination, the plurality of destinations comprising the particular destination;
determining when all of the plurality of items in the batch have been delivered to their respective destinations; and
based on the determination that all of the plurality of items in the batch have been delivered to their respective destinations, providing a single signal that all of the plurality of items in the batch have been delivered to their respective destinations; and
indicating, based on the single signal, that every item in the batch is located at its respective destination.

13. The computer-readable storage medium of claim 12, wherein the method further comprises:
identifying the particular destination for delivery; and
querying the database for the item to be delivered to the particular destination.

14. The computer-readable storage medium of claim 12, wherein the particular destination for delivery is a post office box.

15. The computer-readable storage medium of claim 12, wherein the method further comprises:
identifying a customer associated with the particular destination; and
notifying the customer that the item was delivered to the particular destination.

16. The computer-readable storage medium of claim 15, wherein notifying comprises notifying the customer by telephone.

17. The computer-readable medium storage of claim 14, wherein notifying comprises notifying the customer by email.

18. The computer-readable storage medium of claim 12, wherein the method further comprises:
identifying a customer associated with the particular destination;
configuring the database of delivery destination information to be accessed by the customer.

19. The computer-readable storage medium of claim 12, wherein the method further comprises querying the database for a current location of the item.

20. The computer-readable storage medium of claim 18, wherein the method further comprises updating the database of delivery destination information of the current location of the item.

21. The computer-readable storage medium of claim 12, wherein the method further comprises querying the database for a type of the item.

22. The computer-readable storage medium of claim 12, wherein the method further comprises querying the database for a type of content of the item.

23. An apparatus for managing a database of delivery destination information, the apparatus comprising:
a processor; and
a memory coupled to the processor,
wherein the memory comprises instructions that are executed by the processor to perform operations comprising:
identifying an item to be delivered to a particular destination;
determining a batch comprising a plurality of items, each of the items of the batch to be delivered to one of a plurality of destinations, the batch being determined before delivery, the batch comprising the item to be delivered to the particular destination, the plurality of destinations comprising the particular destination;
determining when all of the plurality of items in the batch have been delivered to their respective destinations; and
based on the determination that all of the plurality of items in the batch have been delivered to their respective destinations, providing a single signal that all of the plurality of items in the batch have been delivered to their respective destinations; and
indicating, based on the single signal, that every item in the batch is located at its respective destination.

24. The apparatus of claim 23, the operations further comprising:
identifying the particular destination for delivery; and
querying the database for the item to be delivered to the particular destination.

25. The apparatus of claim 23, wherein the particular destination for delivery is a post office box.

26. The apparatus of claim 23, the operations further comprising:
identifying a customer associated with the particular destination; and
notifying the customer that the item was delivered to the particular destination.

27. The apparatus of claim 26, wherein notifying comprises notifying the customer by telephone.

28. The apparatus of claim 26, wherein notifying comprises notifying the customer by email.

29. The apparatus of claim 23, the operations further comprising:
identifying a customer associated with the particular destination; and
configuring the database of delivery destination information to be accessed by the customer.

30. The apparatus of claim 23, further comprising means for querying the database for a current location of the item.

31. The apparatus of claim 30, further comprising means for updating the database of delivery destination information of the current location of the item.

32. The apparatus of claim 23, further comprising means for querying the database for a type of the item.

33. The apparatus of claim 23, further comprising means for querying the database for a type of content of the item.

* * * * *

UNITED STATES PATENT AND TRADEMARK OFFICE
CERTIFICATE OF CORRECTION

PATENT NO.            : 7,797,280 B2                                        Page 1 of 1
APPLICATION NO.  : 10/415804
DATED                    : September 14, 2010
INVENTOR(S)         : Ronald Garey It is certified that error appears in the above-identified patent and that said Letters Patent is hereby corrected as shown below:

Please insert the following as item (63) on the title page:

-- Related U.S. Application Data

This application is a § 371 of PCT/US01/42917, filed November 6, 2001, which claims benefit of U.S. Provisional Application No. 60/245,670, filed November 6, 2000. --

Additionally, please insert the following heading and paragraph at col. 1, after the title:

-- CROSS REFERENCE TO RELATED APPLICATIONS

This application is a U.S. National Phase of International Application No. PCT/US01/42917, filed November 6, 2001, the content of which is incorporated herein by reference, and claims the benefit of U.S. Provisional Application No. 60/245,670, filed November 6, 2000, the content of which is incorporated herein by reference. --

Signed and Sealed this
Twenty-ninth Day of March, 2011

David J. Kappos
*Director of the United States Patent and Trademark Office*